United States Patent [19]

Maruta et al.

[11] Patent Number: 5,253,930
[45] Date of Patent: Oct. 19, 1993

[54] AIR BRAKE CONTROL SYSTEM HAVING AN ELECTROMAGNETIC VALVE DEVICE WHICH HAS TWO SET POINTS FOR ESTABLISHING A LAP POSITION

[75] Inventors: Seiki Maruta; Asaji Imanaka, both of Kobe, Japan

[73] Assignee: Nippon Air Brake Co., Ltd., Kobe, Japan

[21] Appl. No.: 766,457

[22] Filed: Sep. 25, 1991

[30] Foreign Application Priority Data

Sep. 26, 1990 [JP] Japan .............................. 2-101352[U]

[51] Int. Cl.$^5$ .................... B60T 15/14; F16K 11/10
[52] U.S. Cl. ........................................ 303/15; 303/3; 137/627.5
[58] Field of Search ................ 303/15, 16, 3, 35, 36, 303/37, 38, 39; 137/627.5

[56] References Cited

U.S. PATENT DOCUMENTS

| | | | |
|---|---|---|---|
| 2,156,720 | 5/1939 | Campbell | 303/36 |
| 3,332,445 | 7/1967 | Allen | 137/627.5 |
| 3,525,555 | 8/1970 | Meyer et al. | 303/15 X |
| 3,814,484 | 6/1974 | Matthews et al. | 303/15 X |
| 4,021,079 | 5/1977 | Bohusch | 303/15 X |
| 4,077,674 | 3/1978 | Doto | 137/627.5 X |
| 4,572,585 | 2/1986 | Guichard | 303/3 |
| 4,685,750 | 8/1987 | Imanaka | 303/15 |
| 4,773,447 | 9/1988 | Imanaka et al. | 137/627.5 |

*Primary Examiner*—Robert J. Oberleitner
*Assistant Examiner*—Peter M. Poon
*Attorney, Agent, or Firm*—J. B. Sotak

[57] ABSTRACT

An electromagnetic valve control system employing a controller circuit for controlling the position of a pneumatic valve by regulating the magnetizing current provided to the electrical solenoid by establishing a first magnetizing current set point when the valve is to be moved from a release position to a lap position and by establishing a second magnetizing current set point when the valve is to be moved from an application position to a lap position.

10 Claims, 4 Drawing Sheets

AIR BRAKE CONTROL SYSTEM HAVING AN ELECTROMAGNETIC VALVE DEVICE WHICH HAS TWO SET POINTS FOR ESTABLISHING A LAP POSITION

FIELD OF THE INVENTION

This invention relates to an electromagnetic solenoid valve device for an air brake control system for railway vehicles and, more particularly, to a railway control arrangement having an electromagnetic valve which has a first exhaust chamber connected to a first exhaust port, a second supply chamber connected to a second supply port, and a third delivery chamber connected to a third delivery port and wherein the electromagnetic valve has a solenoid coil which is provided with a first magnetizing current when the valve moves from a first position to a lap position and which is provided with a second magnetizing current when the valve moves from a second position to a lap position.

BACKGROUND OF THE INVENTION

A conventional system for this type of electromagnetic solenoid valve device is shown and described in Japanese Patent No. 63-3583. This electromagnetic solenoid valve device will now be explained by reference to FIGS. 3 and 4 of the subject application.

As shown in FIG. 3, the electromagnetic valve includes a pneumatic body member 1 having an internal hole 1a which includes a central opening pointing upward. A pair of components consisting of a first intermediate body 2 and a second intermediate body 3 are inserted into the inner hole 1a. The second intermediate body 3 is inserted into the inner opening formed in the first intermediate body 2 and is fixedly held in place by a retaining ring 4. Thus, the intermediate bodies 2 and 3 are disposed with the inner portion of the body 1. The numeral 11 designates a first exhaust port, the numeral 12 is a second supply port, and the numeral 13 is a third delivery port.

The central opening of the second intermediate body portion 3 which has a plurality of steps and includes balancing chamber 20 having a relatively large diameter and includes a first chamber 21 having a relatively small diameter. The first chamber 21 is directly connected to the first exhaust port 11. The upper portion of the first intermediate body 2 includes a third chamber 23, while the lower portion includes a second chamber 22. As shown, the second chamber 22 is directly connected to the second port 12, while the third chamber 23 is directly connected to the third port 13 as well as the balancing chamber 20 via feedback passageway 14.

The central opening in the second intermediate body portion 3, i.e., balancing chamber 20 and the first compartment 21, accommodates a lower portion of a movable valve 25 which is adapted to slide freely and is designed to maintain an air-tight seal. The movable valve 25 is provided with a central passageway or connecting path 25a along longitudinal axis. The connecting path 25a has a top opening facing toward the front end of the second chamber 22 and a lower opening facing toward the rear end of the first chamber 21.

A second biasing spring 26 pushes or urges the movable valve 25 upwardly as viewed in FIG. 3. That is, the front surface of movable valve 25 is pushed upwardly in such a way that the movable valve will become seated on a stationary valve seat 24. The second biasing spring 26 is located between the second intermediate body portion 3 and the movable valve 25. The force of the spring is designed to provide a predetermined load.

The upper end of the intermediate body 2 rests against the lower end of a stationary iron core 30 which has an inner longitudinal hole in which the movable valve seat 31 is inserted and is slidable therein while maintaining air-tight seal. The top end of the movable valve moves relative to the stationary valve seat 24 and is adapted to engage and seat against the top surface of the movable valve 25.

The upper end of the movable valve 31 is disposed within or is inserted into the lower end of the movable iron core 32 and is fixed thereto in a suitable manner. A first biasing spring 33 is caged between the underside of the enlarged end of the movable valve seat 31 and upper end of the stationary iron core 30. The biasing spring 33 applies an upward force to the movable valve seat 31 which is in direction opposite to the magnetic attractive force emanating from the movable iron core 32.

The center passage portion formed along the longitudinal axial of the movable valve seat 31 and movable iron core 32 make up a breathing or aspirating passage which has one end at the top end of the movable valve seat 31 and has the other end opened at the bottom end of the movable iron core 32 to interconnect the upper and lower surrounding chambers 35 and 36.

As shown in FIG. 3, numeral 40 is a holding plate, numeral 41 is a guiding body, numeral 42 is an insulative bobbin, numeral 43 designates an electrical solenoid, numeral 44 designates a protective cover, numeral 45 is a stopper member, and numeral 46 is a retaining or stopper ring.

The operation of the electromagnetic valve device of FIG. 3 will be explained with reference to the curves of FIG. 4. As shown, FIG. 4 depicts the relationship between the stroke of the movable valve seat 31 and the biasing forces of the first and second springs 33 and 26, respectively, which is illustrated on the right-hand side of FIG. 4, and the relationship between the magnetizing current and magnetic force of electrical solenoid 43 which is illustrated on the left-hand side of FIG. 4. Initially, when the solenoid 43 in FIG. 3 is demagnetized, the movable valve seat 31 is unseated from movable valve 25 by the force exerted by the first biasing spring 33, and the movable valve 25 is seated against the stationary valve seat 24 by the force exerted by the second spring 26. Therefore, the first port 11 and the first chamber 21 along with the third port 13 and the third chamber 23 are connected while the second port 12, and the second chamber 22 will be closed. We will refer to this condition as a first position or position A.

As the magnetizing current supplied to the electrical solenoid 43 is increased, a magnetic force or field strength conveyed to the movable iron core 32 will proportionally increase. However, as shown in FIG. 4, when the magnetizing current is within range X, the magnetic force which is represented by curve F32 does not exceed the spring force as represented by curve F33 which is exerted by the first spring 33. Thus, the bottom end of movable valve seat 31 cannot become seated on the movable valve 25 and therefore the valve remains in position A.

When the magnetizing current continues to increase, the magnetic force F32 will eventually reach the level of the spring force F33 so that the bottom end of the movable valve seat 31 is moved onto the top end of the movable valve 25 so that the first port 11 and the first chamber 21 as well as the third port 13 and the third chamber 23 are shut off. Thus, all three ports 11, 12, and 13 are isolated or shut off since the valve is in lap position. At this time, the force shown by curve F26 which is exerted by the second spring 26 is working against the magnetic force F32. Therefore, the total exerting force shown by curve F50 which is a combination of both springs 33 and 26 maintains the valve in the lap position even though the magnetizing current continues to increase. This is illustrated by the range Y in FIG. 4.

Now, as the magnetizing current continues to increase the magnetic force F32 will eventually overcome the total spring force F50 and will enter the range Z. Thus, the movable valve 25 will remain seated on the movable valve seat 31 but will unseat the movable valve 25 from stationary valve seat 24, so that the first port 11 and the first chamber 21 will remain shut off. However, the second port 12, the second chamber 22, and the third port 13 and the third chamber 23 will become connected. We will refer to this condition as the second position or position B.

Therefore, one can switch to any one of 3 positions, namely, position A, LAP position, or position B, by controlling the magnetizing current which is selected and outputted by a drive controller as will be described hereinafter. In operation, the positions have been arbitrarily preset in X, Y, and Z magnetizing current ranges as either position A setting value, LAP position setting value, or position B setting value.

In at least one conventional system, however, there has been a problem when one tries to output the actual magnetizing current by the drive controller of the electromagnetic valve device in which stable control can be obtained only when one selects a narrow current range for the LAP position setting value. That is, in viewing FIG. 4, it will be seen that the area Y that is formed when the magnetizing current increases from position A, and when the magnetizing current decreases from position B. This difference causes a phenomenon in which the common range Y becomes smaller than that shown in FIG. 4.

The present invention was made to solve such a problem, and attempts to provide an electromagnetic valve device with a drive controller which is capable of outputting magnetizing currents with precision and stability in controlling the LAP position.

OBJECTS AND SUMMARY OF THE INVENTION

Accordingly, it is an object of this invention to provide a new and improved electromagnetic valve system for air brake control equipment for railway vehicles.

Another object of this invention is to provide an electromagnetic solenoid valve device comprising a body which includes a first chamber leading to a first port, a second chamber leading to a second port, and a third chamber leading to a third port, a position A connecting the first and third chambers, a position B connecting the second and third chambers, said electromagnetic valve isolates each of the chambers between the positions A and B to assume a LAP position, a drive controller for providing magnetizing current to the solenoid of the electromagnetic valve, and having the characteristic of possessing different setting values of magnetizing currents when the drive controller moves the electromagnetic valve to the LAP position either from position A in which a first lap magnetic current setting value is established or from the position B in which a second lap magnetic current setting value is established.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Within the pneumatic body, the valve device possesses the first chamber connected to the first port, the second chamber connected to the second port, the third chamber connected to the third port. When the valve is in position A it connects the first and third chambers and when the valve is in position B it connects the second and third chambers. The electromagnetic valve that can select the LAP position which is in between position A and position B to isolate or disconnect each of the chambers. The present system also has a drive controller which supplies the magnetizing current to the solenoid of the electromagnetic valve so as to correspond to each position mentioned above. The system provides values of magnetizing currents in which the drive controller places the electromagnetic valve in a LAP position, the setting value for the first lap position as the position shifts from position A to the LAP position and the setting value for the second lap position as the position shifts from position B to the LAP position are different from each other.

Figure 4:
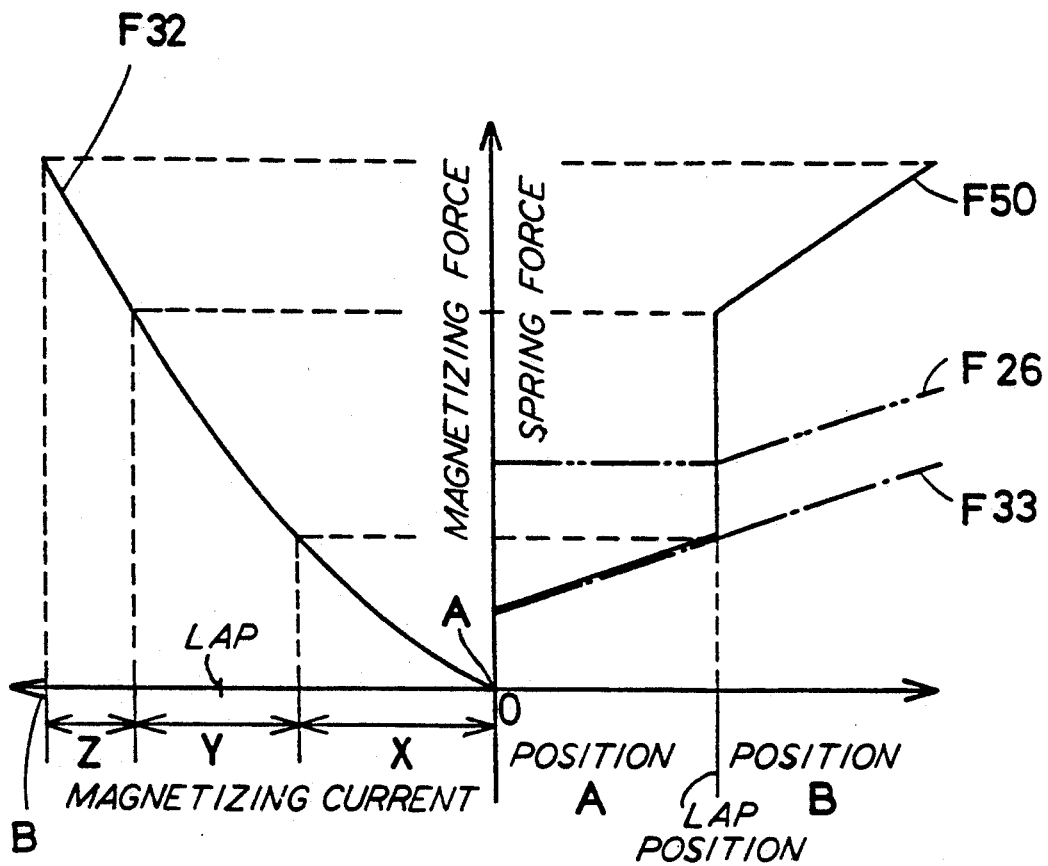
FIG. 4 shows a diagram to explain the relationships between the solenoid's magnetizing current and magnetic force between valve stroke and spring force of the valve of FIG. 3.
Figure 5:
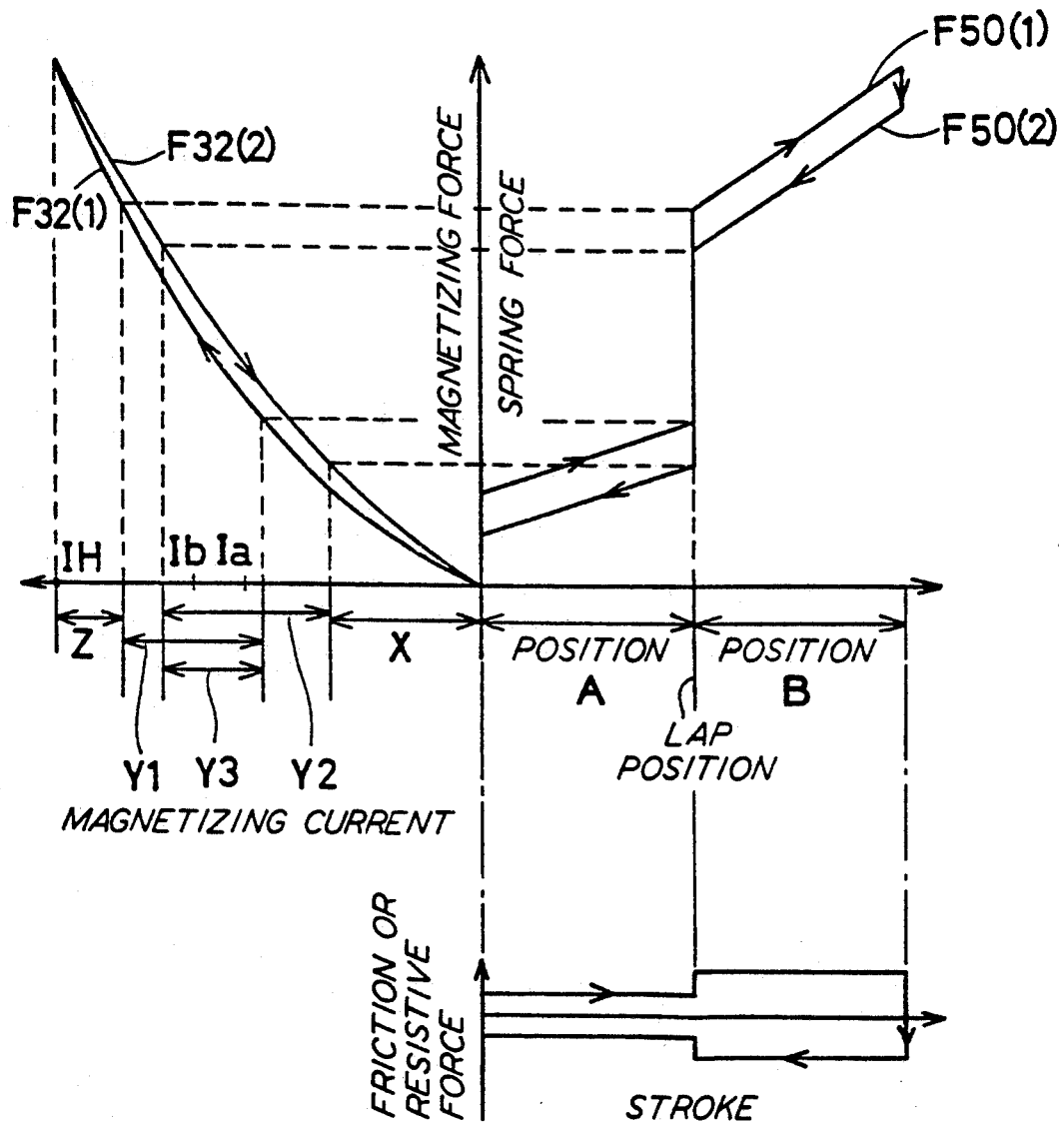
FIG. 5 illustrates the relationships between the magnetizing current of solenoid with hysteresis characteristics and magnetic force, between stroke and spring force, and between stroke and hysteresis characteristics of resistive forces.

The reason why the lap position setting value becomes narrower in the present system than the range Y illustrated in FIG. 4 is due to the magnetizing characteristics of the solenoid and/or hysteresis of stroke resistance, i.e., friction, caused by movable valve seat and movable valve. In viewing FIG. 5, it will be seen that hysteresis is added. That is, the magnetizing force F32 has a hysteresis curve of F32(1) caused by the magnetizing current increase and has a hysteresis curve F32(2) caused by the magnetizing current decrease. Also, FIG. 5(a) shows a mechanical friction due to sealing components which cause a hysteresis because the resistance of the movable valve seat and/or movable valve differs in one direction from the other direction when the movable valve seat and movable valve move against the spring force. Therefore, the total combined force F50 becomes either curve F50(1) in case of magnetizing current increase or curve F50(2) in case of magnetizing current decrease when the resistive force against the stroke is added to those forces of the first and second springs 33 and 26. Because of this, the lap range becomes equal to Y1 when the valve position shifts from the position A to the LAP position and range Y2 when the valve position shifts from the position B to the LAP position and resulting in range Y3 when the direction of the position change occurs so that the range Y3 becomes relatively narrow.

The present invention was made with the scope and knowledge, the system possesses different setting values of the first lap setting value for shifting from position A to the LAP position and the second lap setting value for shifting from position B to the LAP position. Thus, the present system selects the first and second lap setting values and outputs by determining whether the lap position is coming from position A or position B.

Figure 1:
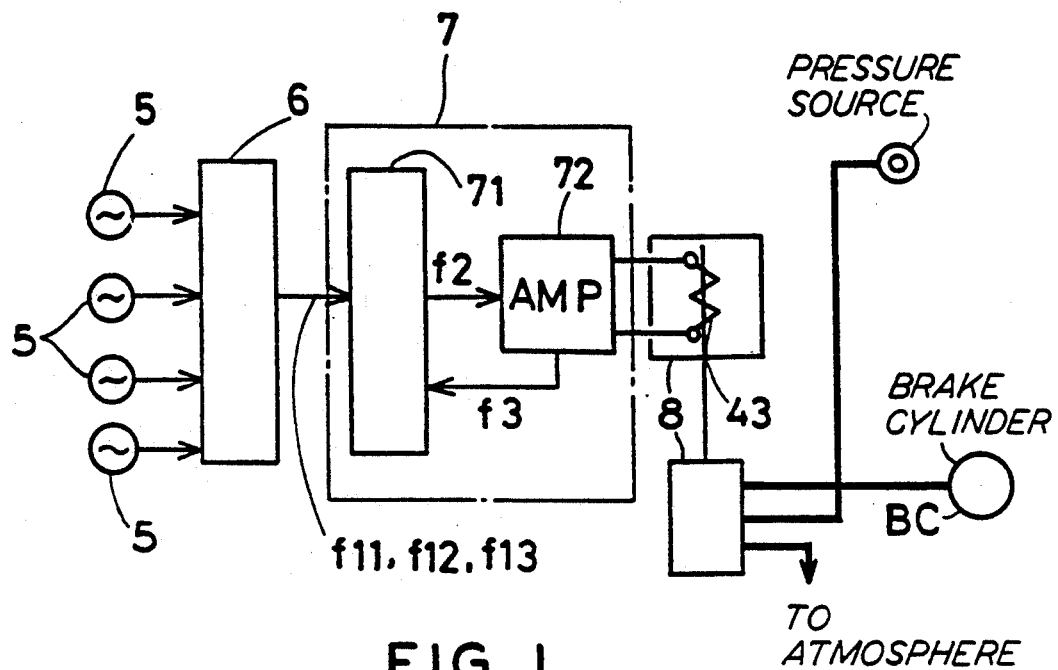
FIG. 1 is a schematic circuit block diagram of the electromagnetic valve system of this invention is applied to a drive prevention apparatus for railway cars.
Figure 2:
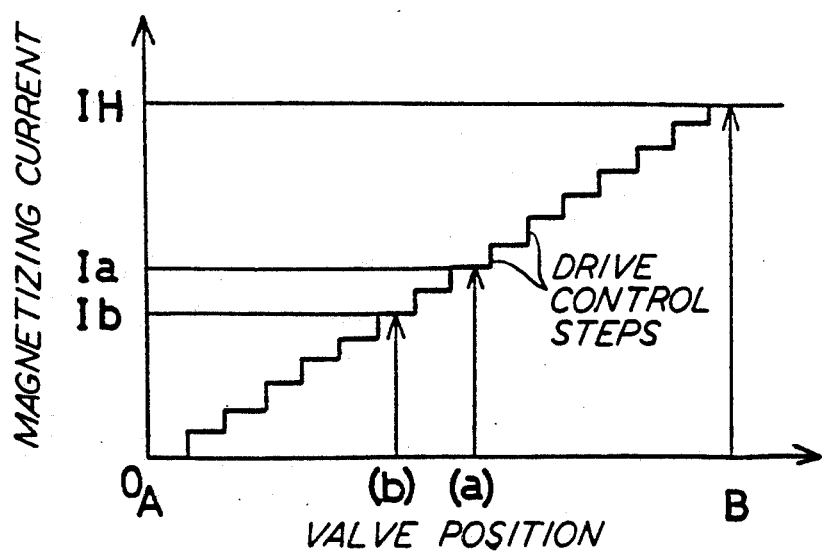
FIG. 2 shows an explanatory diagram which illustrates settings of magnetizing currents in the electromangetic valve device of this invention.
Figure 3:
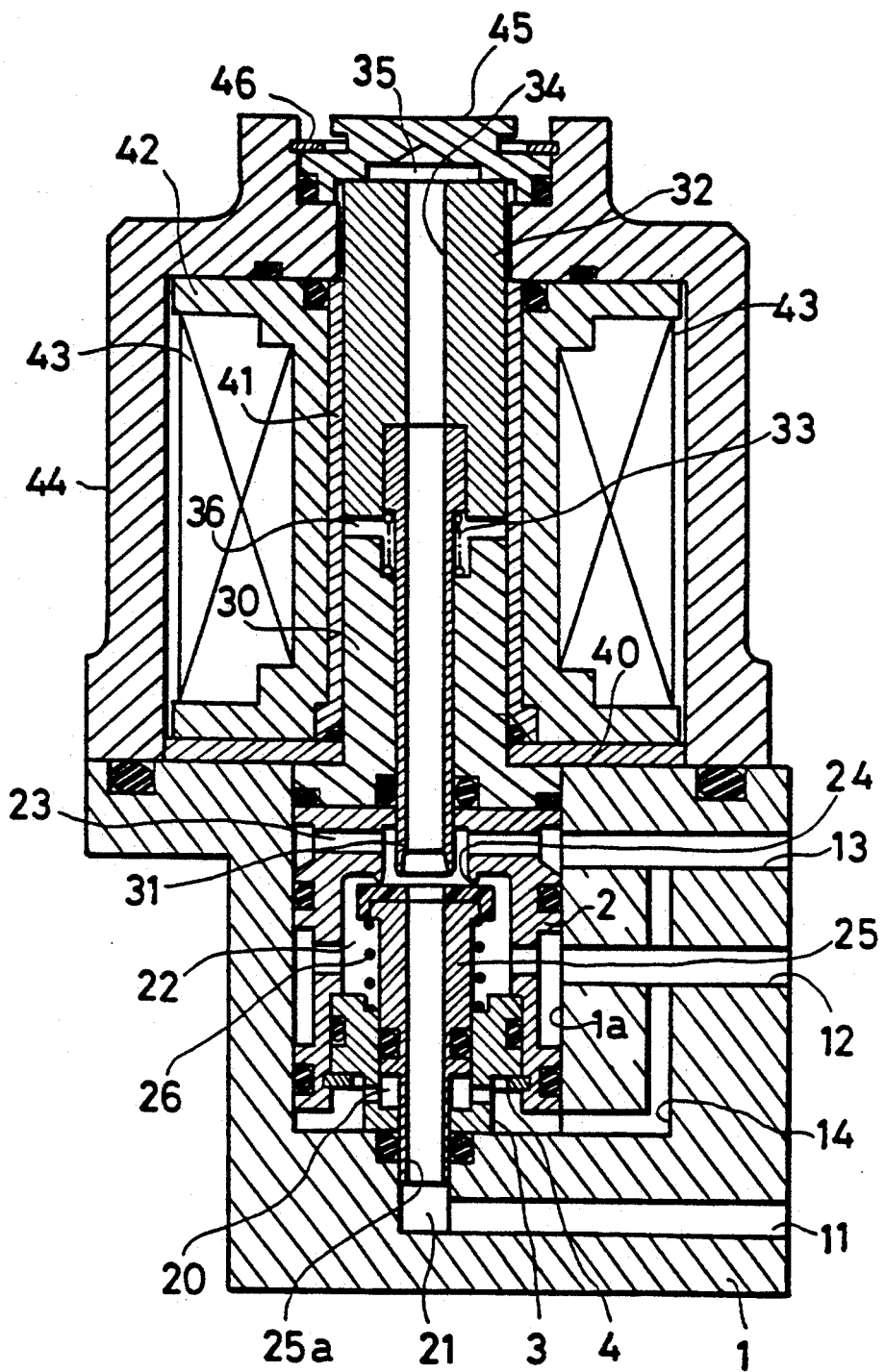
FIG. 3 is a cross-sectional view of a conventional electromagnetic valve device.

Referring now to FIG. 1, there is shown a circuit block diagram of the electromagnetic valve system in accordance with this invention which is applied to a prevention arrangement for railway cars, and FIG. 2 is a graphical illustration of the settings of magnetizing currents in the electromagnetic valve system in this invention.

In viewing FIG. 1, it will be seen that the axle velocities are detected by a plurality of conventional encoders 5 which are suitably installed on each axle of the railway vehicle, and the respective generated data is fed into the drive prevention controller 6. The drive prevention controller 6 calculates velocity differences between the respective axles and their decelerating velocity, detects slip or recovery, and then outputs necessary electrical signals f11-f13. The signal f11 signifies a switching to position A. The signal f12 designates switching to position B, and signal f13 signifies a switching to the LAP position. The electromagnetic valve control system is composed of a drive controller 7, and an electromagnetic valve 8 which supplies pressurized air to brake cylinder BC based on 20 which of the signals f11-f13 is present. The drive controller 7 includes a current controller 71, such as, a sixteen (16) step digital circuit integrated circuit (IC) and also an amplifier circuit 72. In addition to the output signal f2 received from the current controller 71, the amplifier circuit 72 produces a feedback signal which is fed back to the current controller 71. The current controller 71 can readily identify the present or actual switch position, namely, position A, position B, or the LAP position. Switching from either position A to the LAP position, or position B to the LAP position is distinguished by the system, and each different first lap setting value or second lap value is outputted.

FIG. 2 shows an example of the operation of the current controller 71 using a sixteen (16) step digital integrated circuit (IC). The magnetizing current is 0 ampere at position A, and IH ampere at position B. But, the magnetizing current becomes Ia ampere at the first lap setting value (a) for changing from position A to the LAP position, and Ib ampere at the second lap setting value (b) for changing from position B to the LAP position. Such first or second lap setting values (a) and (b) are to be set in-between the upper and lower limits of ranges Y1 and Y2 as shown in FIG. 5. Thus, the electromagnetic valve will be controlled with stability and certainty. Furthermore, such switching of magnetizing current IA and Ib can be controlled not only by the drive controller as in the present example, but by the input signals provided by the drive prevention controller 6. In that case, the signal f13 needs to be outputted as signals corresponding to the first setting valve and the second setting value.

The electromagnetic valve system of the present invention cannot only be used in rail cars, as described above, but also can be used in other control systems which may require a similar operating electromagnetic valve system. However, it is most appropriate to use as an electromagnetic valve system when hysteresis properties are taken into consideration, especially for rail cars which tend to have large errors of magnetizing current due to the varying ambient temperature and power source voltage.

The magnetizing current with which the drive controller moves the electromagnetic valve into the LAP position is set at different values for the case of shifting from position A to the LAP position and for the case of shifting from position B to the LAP position. The system readily determines whether lapping is reached from position A or position B and outputs either the first or the second lap setting value, and thus controls the LAP position with stability and certainty because of the ease of position switching due to the accuracy allowance of the magnetizing current.

The following is a nomenclature list of the components and elements shown and disclosed in the drawings and specification of the subject invention:

1. Valve body
5. Encoders
7. Drive controller
8. Electromagnetic valve
71. Current control
72. amplifier
11. First port
12. Second port
13. Third port
21. First chamber
22. Second chamber
23. Third chamber
(a) First lap setting value
(b) Second lap setting value
43. Electrical solenoid Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly set forth in what is claimed. It will be understood that variations, modifications, equivalents and substitutions for components of the above specifically-described embodiment of the invention may be made by those skilled in the art without departing from the spirit and scope of the invention as set forth in the appended claims.

What we claim is:

1. An electromagnetic solenoid valve system comprising an electromagnetic solenoid valve body which includes a first chamber leading to a first port, a second chamber leading to a second port, and a third chamber leading to a third port, a position A connecting said first and third chambers, a position B connecting said second and third chambers, said electromagnetic valve isolates each of said chambers between the positions A and B to assume a lap position, a drive controller for providing magnetizing current to the solenoid of said electromagnetic valve, and having the characteristic of possessing different setting values of magnetizing currents due to the stroke resistance of said electromagnetic solenoid valve when said drive controller moves the electromagnetic valve to the LAP position either from said position A in which a first lap magnetic current setting value is established or from said position B in which a second lap magnetic current setting value is established and in which the magnetizing force follows a first hysteresis curve when the electromagnetic valve moves from said position A to said position B and in which the magnetizing force follows a second hysteresis curve when the electromagnetic valve moves from said position B to said position A.

2. The electromagnetic solenoid valve system as defined in claim 1, wherein said first chamber is an exhaust chamber which is connected to atmosphere via said first port.

3. The electromagnetic solenoid valve system as defined in claim 1, wherein said second chamber is a supply chamber which is connected to a source of air pressure via said second port.

4. The electromagnetic solenoid valve system as defined in claim 1, wherein said third chamber is a delivery chamber which is connected to a brake cylinder via said third port.

5. The electromagnetic solenoid valve system as defined in claim 1, wherein said drive controller includes an integrated circuit current controller.

6. The electromagnetic solenoid valve system as defined in claim 5, wherein an amplifier circuit is connected to an output of said integrated circuit current controller.

7. The electromagnetic solenoid valve system as defined in claim 6, wherein the output of said amplifier is connected to the electrical solenoid of the electromagnetic solenoid valve system.

8. The electromagnetic solenoid valve system as defined in claim 6, wherein said amplifier circuit provides feedback to said integrated circuit current controller.

9. The electromagnetic solenoid valve system as defined in claim 1, wherein a plurality of velocity determining means for sensing the velocity of each respective axle of a railway vehicle and for providing electrical signals to an input of said drive controller.

10. The electromagnetic solenoid valve system as defined in claim 9, wherein said electrical signals conveyed to said drive controller results in whether the electromagnetic solenoid valve is moved to position A, position B and the LAP position.

* * * * *